United States Patent
Bocage et al.

(10) Patent No.: US 10,739,167 B2
(45) Date of Patent: Aug. 11, 2020

(54) MEASUREMENT METHOD USING AN INDUCTIVE DISPLACEMENT SENSOR

(71) Applicant: SAFRAN ELECTRONICS & DEFENSE, Boulogne Billancourt (FR)

(72) Inventors: Frédéric Bocage, Boulogne Billancourt (FR); Daniel Sauvent, Boulogne Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 16/627,684

(22) PCT Filed: May 25, 2018

(86) PCT No.: PCT/EP2018/063791
§ 371 (c)(1),
(2) Date: Dec. 30, 2019

(87) PCT Pub. No.: WO2019/001858
PCT Pub. Date: Jan. 3, 2019

(65) Prior Publication Data
US 2020/0158539 A1 May 21, 2020

(30) Foreign Application Priority Data

Jun. 30, 2017 (FR) .................................. 17 56235
Oct. 2, 2017 (FR) .................................. 17 59199

(51) Int. Cl.
*G01D 5/22* (2006.01)
*G01D 5/20* (2006.01)
*G01D 18/00* (2006.01)

(52) U.S. Cl.
CPC .......... *G01D 5/2291* (2013.01); *G01D 5/2053* (2013.01); *G01D 18/00* (2013.01)

(58) Field of Classification Search
CPC .... G01D 5/2291; G01D 18/00; G01D 5/2053; G01D 5/2046
See application file for complete search history.

(56) References Cited

U.S. PATENT DOCUMENTS

| 7,893,687 B2 * | 2/2011 | Buisson | G01D 5/2266 318/657 |
| 2003/0141917 A1 * | 7/2003 | McBrien | G01D 5/2266 327/304 |

(Continued)

FOREIGN PATENT DOCUMENTS

FR 2 921 720 A1 4/2009

*Primary Examiner* — Mohamed Charioui
*Assistant Examiner* — Christine Y Liao
(74) *Attorney, Agent, or Firm* — Muncy, Geissler, Olds & Lowe, P.C.

(57) ABSTRACT

A measurement method using an inductive displacement sensor including a magnetic core and transformer with a primary winding and two secondary windings. The method includes an excitation phase of applying an AC excitation voltage across the primary winding terminals; acquisition phase for acquiring and digitizing two measurement voltages across the two secondary windings' terminals; first main processing phase performed on two measurement voltages including the steps of: multiplying the measurement voltage by a reference sine wave and reference cosine wave to obtain two resulting signals; carrying out a first integration of each resulting signal over a sliding window with width equal to the excitation period to obtain two integrated signals; carrying out a second integration of each integrated signal over a sliding window with width equal to half an excitation period to obtain two doubly integrated signals; producing amplitude of the measurement voltage from the doubly integrated signals; first final processing phase for producing a positional estimate of the magnetic core from the amplitudes of the two measurement voltages.

7 Claims, 6 Drawing Sheets

(56) References Cited

U.S. PATENT DOCUMENTS

| | | | |
|---|---|---|---|
| 2007/0024274 A1* | 2/2007 | Riedel | G01D 5/2291 324/207.18 |
| 2007/0179738 A1* | 8/2007 | Stolan | G01D 5/2291 702/158 |
| 2016/0033306 A1* | 2/2016 | Hubbell | G01D 5/2291 244/76 R |
| 2016/0123785 A1* | 5/2016 | Gaude | F15B 1/24 251/1.1 |
| 2016/0197620 A1 | 7/2016 | Gore et al. | |
| 2017/0153126 A1* | 6/2017 | Wu | G01D 5/2258 |

\* cited by examiner

MEASUREMENT METHOD USING AN INDUCTIVE DISPLACEMENT SENSOR

The invention relates to the field of measurement methods using an inductive displacement sensor.

BACKGROUND OF THE INVENTION

Figure 1:
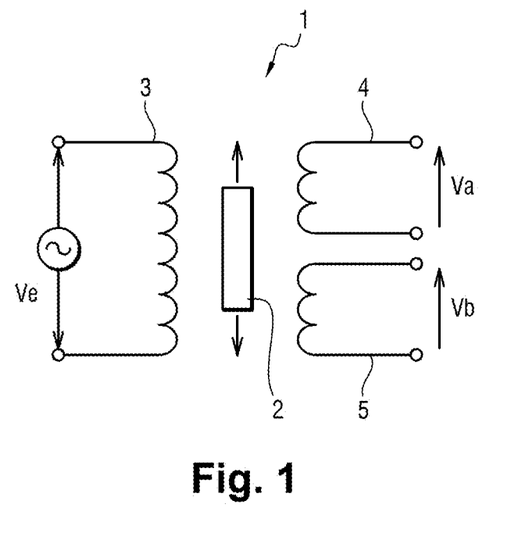
FIG. 1 depicts an LVDT sensor.

With reference to FIG. 1, an LVDT (for Linear Variable Differential Transformer) sensor 1 conventionally includes a cylindrical body in which a transformer and a magnetic core 2 are integrated.

The transformer comprises a primary winding 3, a first secondary winding 4 and a second secondary winding 5. The magnetic core 2 slides axially within the cylindrical body and thus changes the distribution of the magnetic field that prevails in said cylindrical body.

An excitation voltage Ve is applied across the terminals of the primary winding 3. The excitation voltage Ve has a specific excitation period and a specific excitation frequency. A first measurement voltage Va is measured across the terminals of the first secondary winding 4 and a second measurement voltage Vb is measured across the terminals of the second secondary winding 5.

The position of the magnetic core 2 is obtained from the ratio R:

$$R=(\mathrm{amp}(Va)-\mathrm{amp}(Vb))/(\mathrm{amp}(Va)+\mathrm{amp}(Vb)),$$

where amp(Va) is the amplitude of the first measurement voltage Va and where amp(Vb) is the amplitude of the second measurement voltage Vb.

Generally, the first measurement voltage Va is acquired and digitized over an entire excitation period and at a sampling frequency higher than the excitation frequency, and amp(Va) is obtained by means of synchronous demodulation of the first measurement voltage Va over this excitation period. Then, during the subsequent excitation period, the second measurement voltage Vb is acquired and digitized with the same sampling frequency, and amp(Vb) is obtained by means of synchronous demodulation of the second measurement voltage Vb over one excitation period.

The ratio R is then calculated once amp(Va) and then amp(Vb) have been obtained. The response time of the measurement is therefore greater than two excitation periods, which is relatively long. However, this solution allows the acquisition to be carried out by a common part of a single acquisition chain (not including electromagnetic interference filtering components), and therefore by the same analog-to-digital converter. The gain error for the measurement is thus reduced.

It should be noted that the non-zero velocity of the magnetic core 2 means that the ratio R is not constant across the two excitation periods, and this generates a drag effect on the measurement of the position of the magnetic core 2.

Alternatively, the first measurement voltage Va and the second measurement voltage Vb are acquired and digitized simultaneously by two separate acquisition chains over the course of the same excitation period and with the same sampling frequency.

The ratio R is then calculated once amp(Va) and amp(Vb) have been simultaneously obtained, and therefore the response time of the measurement is in this case close to one excitation period. However, the gain error is increased due to the use of two separate acquisition chains for VA and VB.

Alternatively, it is also possible to use asynchronous demodulation. Asynchronous demodulation of this kind is, however, more sensitive to environmental noise, whatever the frequency thereof.

OBJECT OF THE INVENTION

The object of the invention is to improve the response time and the precision of an inductive displacement sensor and of an acquisition chain connected to said inductive displacement sensor, and to simplify said acquisition chain.

SUMMARY OF THE INVENTION

With a view to achieving this aim, what is proposed is a measurement method using an inductive displacement sensor that includes a transformer and a magnetic core, the transformer comprising a primary winding and two secondary windings, the measurement method including:
- an excitation phase comprising the step of applying an AC excitation voltage across the terminals of the primary winding;
- an acquisition phase comprising the steps that have the aim of acquiring and digitizing two measurement voltages across the terminals of the two secondary windings;
- a first main processing phase, which is performed on the two measurement voltages and which, for each measurement voltage, comprises the steps of:
  - multiplying the measurement voltage by a reference sine wave and by a reference cosine wave in order to obtain two resulting signals;
  - carrying out a first integration of each resulting signal over a sliding window that has a width equal to the excitation period in order to obtain two integrated signals;
  - carrying out a second integration of each integrated signal over a sliding window that has a width equal to half an excitation period in order to obtain two doubly integrated signals;
  - producing an amplitude of the measurement voltage from the doubly integrated signals;
- a first final processing phase, which comprises the step of producing an estimate of a position of the magnetic core from the amplitudes of the two measurement voltages.

Since it is carried out at each sampling interval over the last excitation period, the first main processing phase of the measurement method according to the invention is therefore consistent with "sliding synchronous demodulation".

The measurement is therefore insusceptible to environmental noise. Moreover, an estimate of the position of the magnetic core can be produced after each acquisition of a new sampled value of each measurement voltage, which reduces the response time and increases refreshing of the measurement.

Finally, the measurement method according to the invention can be performed using a single analog-to-digital converter which acquires the two measurement voltages alternately (the sampling rate of the analog-to-digital converter is doubled but just one analog-to-digital converter is used rather than two). The acquisition chain connected to the inductive displacement sensor is thus simplified, and the gain error that exists in the case of two separate analog-to-digital converters is eliminated.

What is additionally proposed is a computer intended to be connected to an inductive displacement sensor, the computer comprising a processing component and an analog-to-digital converter, which are designed to perform the measurement method that has just been described.

What is moreover proposed is a system comprising a computer such as has just been described and an inductive displacement sensor.

Other features and advantages of the invention will become apparent on reading the description of one particular nonlimiting embodiment of the invention below.

BRIEF DESCRIPTION OF THE DRAWINGS

Reference will be made to the appended drawings, in which.

DETAILED DESCRIPTION OF THE INVENTION

The invention is implemented in the present case in a system comprising an LVDT sensor and a computer connected to the LVDT sensor.

The LVDT sensor is similar to the LVDT sensor 1 that has just been described.

The computer includes a processing component and an acquisition chain that comprises an analog-to-digital converter. The processing component and the analog-to-digital converter are designed to perform the measurement method according to the invention.

The processing component in the present case is an FPGA, but it could perfectly well be a different component, for example a processor, a microcontroller or an ASIC.

The measurement method firstly allows a position of the magnetic core 2 of the LVDT sensor 1 to be estimated.

For this purpose, the measurement method firstly includes an excitation phase.

During the excitation phase, the computer produces an excitation voltage Ve which is applied across the terminals of the primary winding 3 of the transformer of the LVDT sensor 1. The excitation voltage Ve is applied continuously in the present case, throughout a measurement time during which measurements have to be taken. The excitation voltage has a specific excitation period Texc and a specific excitation frequency Fexc (with Texc=1/Fexc).

The measurement method furthermore includes an acquisition phase. During the acquisition phase, the first measurement voltage Va and the second measurement voltage Vb are acquired by the computer and then digitized by the analog-to-digital converter with a certain sampling frequency that is much higher than the excitation frequency.

The first measurement voltage Va and the second measurement voltage Vb are digitized alternately at each sampling interval by the analog-to-digital converter.

The processing component acquires the sampled values of the first measurement voltage Va and of the second measurement voltage Vb.

The sampled values of the first measurement voltage Va and of the second measurement voltage Vb at the instant n will be denoted Van and Vbn. Since the values are acquired alternately, the instant n has a time shift for the first measurement voltage Va and for the second measurement voltage Vb. Likewise, the number of sampling points of Va (and of Vb) per excitation period Texc will be denoted NPT below. In the present case, NPT=32, but the number NPT could be different, for example equal to 64.

Figure 2:
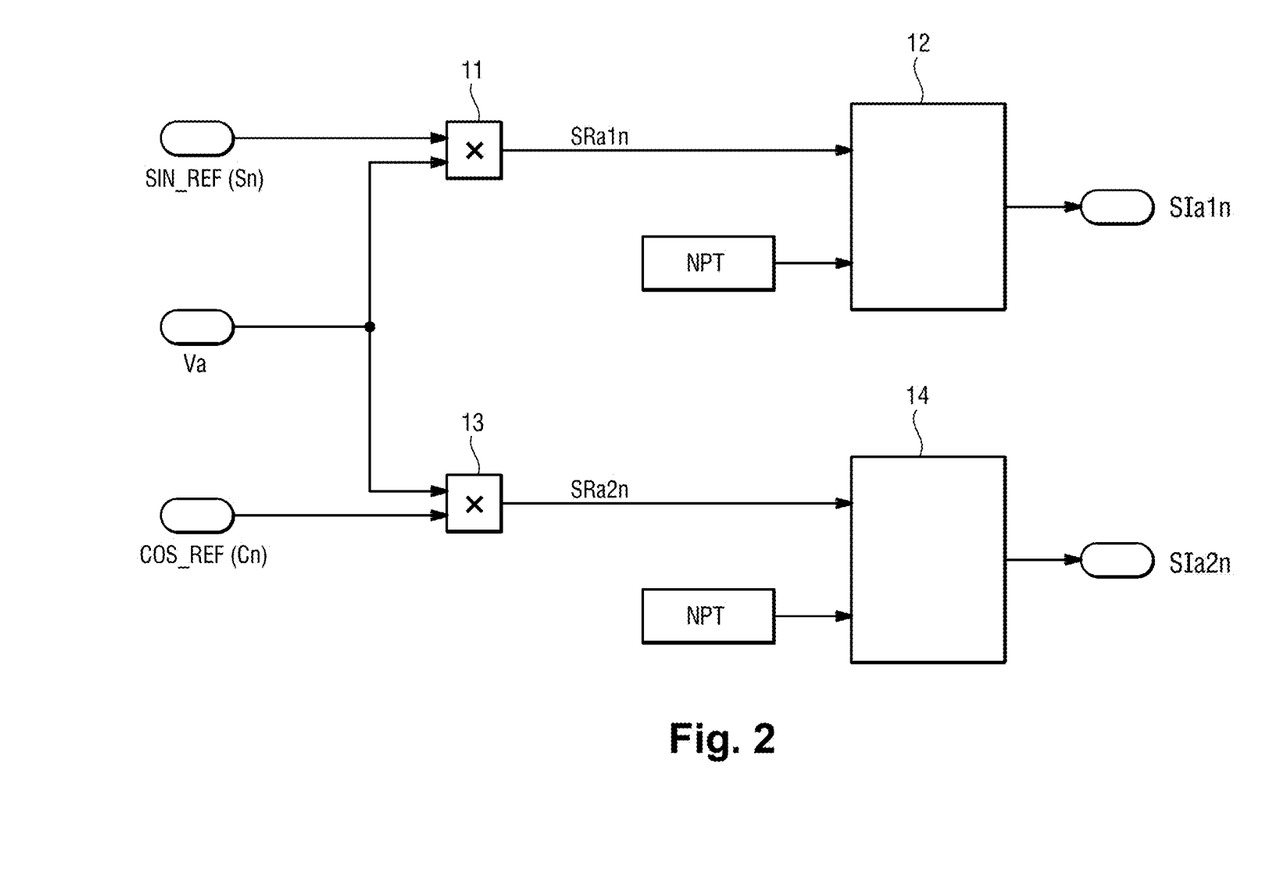
FIG. 2 depicts one part of the first main processing phase of the measurement method according to the invention.
Figure 3:
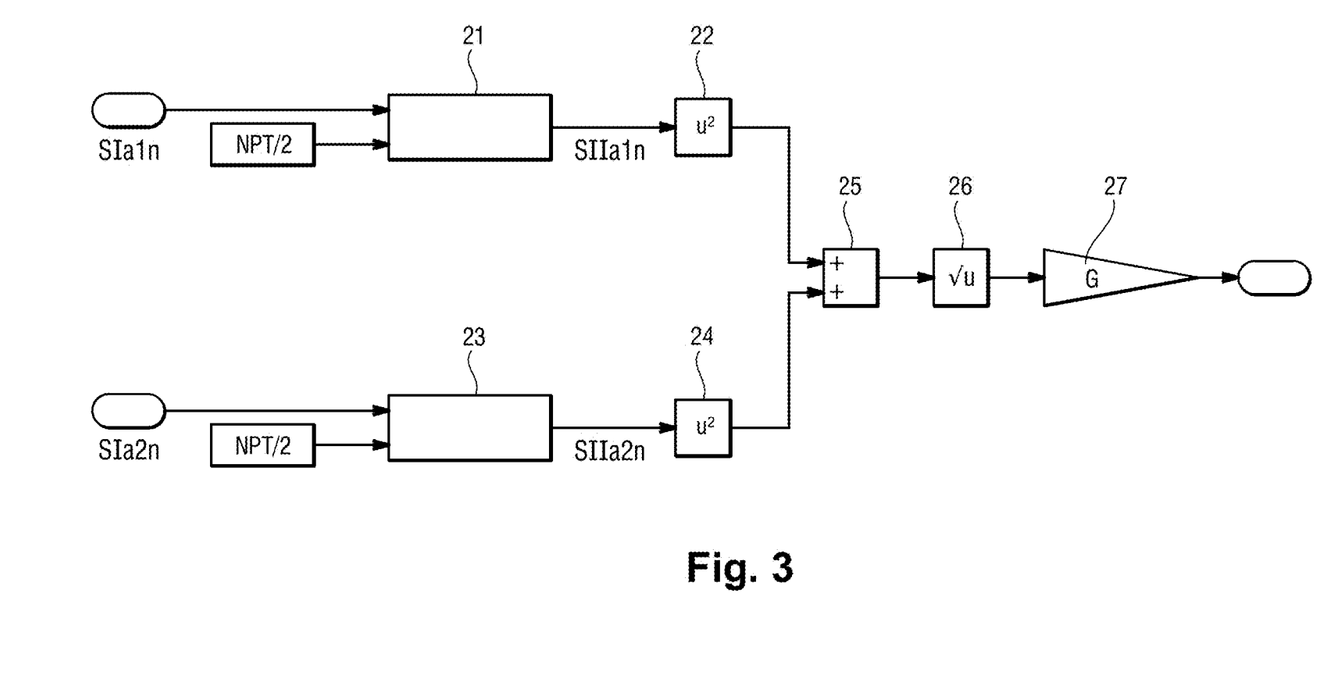
FIG. 3 depicts another part of the first main processing phase and a part of the first final processing phase.

With reference to FIGS. 2 and 3, the measurement method furthermore includes a first main processing phase, which is performed on the first measurement voltage Va and on the second measurement voltage Vb. FIGS. 2 and 3 illustrate the performance of the first main processing phase only on the first measurement voltage Va, but what follows also applies to the second measurement voltage Vb.

The first main processing phase is carried out by the processing component of the computer. A certain number of function blocks are programmed in the processing component. These function blocks include a first multiplier 11, a first integrator block 12, a second multiplier 13 and a second integrator block 14. These function blocks can be seen in FIG. 2.

A reference sine wave SIN_REF and a reference cosine wave COS_REF, which have a frequency equal to the excitation frequency Fexc, are generated within the processing component. The reference sine wave SIN_REF and the reference cosine wave COS_REF are discretized with a period equal to the sampling period. The elements thus obtained are called Sn (for the reference sine wave SIN_REF) and Cn (for the reference cosine wave COS_REF) below.

The steps that follow are first of all applied to the first measurement voltage Va after every instance of digitization thereof VAn by the analog-to-digital converter.

The first multiplier 11 multiplies the sampled value Van of the first measurement voltage Va acquired at the instant n by the reference sine wave SIN_REF discretized at the instant n, i.e. Sn, to give a first resulting signal, which will be denoted SRa1$n$ below.

Then, for each new sampled value Van of the first measurement voltage Va, the first integrator block 12 integrates the first resulting signal SRa1$n$ obtained for the last NPT sampled values Van, thus covering an excitation period Texc. A first integration of the first resulting signal SRa1$n$ is thus carried out over a sliding window that has a duration equal to the excitation period Texc, this sliding window ending the last time that a sampled value Van is acquired.

A first integrated signal SIa1$n$ is then obtained at the output of the first integrator block 12 for each new sampled value Van of the first measurement voltage Va.

Likewise, the second multiplier 13 multiplies the sampled value Van of the first measurement voltage Va acquired at the instant n by the reference cosine wave COS_REF discretized at the instant n, i.e. Cn, to give a second resulting signal, which will be denoted SRa2$n$ below.

Then, for each new sampled value Van of the first measurement voltage Va, the second integrator block 14 integrates the second resulting signal SRa2$n$ obtained for the last NPT sampled values Van, thus covering an excitation period Texc. A first integration of the second resulting signal SRa2$n$ is thus carried out over a sliding window that has a duration equal to the excitation period Texc, this sliding window ending the last time that a sampled value Van is acquired.

A second integrated signal SIa2$n$ is then obtained at the output of the second integrator block 14 for each new sampled value Van of the first measurement voltage Va.

In the present case, the first integrator block 12 and the second integrator block 14 are similar. An exemplary algorithm of the first integrator block 12 and of the second integrator block 14 is provided in Appendix 1 to this description. The integration may be a zero-order integration (as proposed in Appendix 1), a first-order integration (trapezoidal integration), a second-order integration, or even a higher-order integration.

The function blocks programmed in the processing component also include a third integrator block 21, a first exponentiation block 22, a fourth integrator block 23, a second exponentiation block 24, an adder 25, a calculation block 26 and a gain block 27. These function blocks can be seen in FIG. 3.

The steps that follow are applied, for each new sampled value Van of the first measurement voltage Va, to the first integrated signal SIa1$n$ and to the second integrated signal SIa2$n$ of the first measurement voltage Va.

The second integration of the first integrated signal SIa1$n$ uses the third integrator block 21. This time, the second integration is carried out, for each new sampled value Van of the first measurement voltage Va, over a sliding window of the last NPT/2 points, which corresponds to a width equal to half an excitation period.

Likewise, the second integration of the second integrated signal SIa2$n$ uses the fourth integrator block 23. The second integration is carried out, for each new sampled value Van of the first measurement voltage Va, over a sliding window of the last NPT/2 points, which corresponds to a width equal to half an excitation period.

The second integration allows a residual signal that remains after the first integration to be eliminated, this residual signal having a frequency equal to twice the excitation frequency Fexc. This residual signal is present whenever the rate of change of the sensor position (i.e. the rate of change of the ratio) is not negligible over the course of an excitation period (the ratio cannot be considered to be constant over an excitation period given the measurement precision expected). That assumption is deemed to be valid in algorithms for conventional demodulation based on single integration.

A first doubly integrated signal SIIa1$n$ and a second doubly integrated signal SIIa2$n$ are thus obtained. The first doubly integrated signal SIIa1$n$ and the second doubly integrated signal SIIa2$n$ are then each squared by the first exponentiation block 22 and by the second exponentiation block 24, respectively. The processing carried out by the blocks 22, 24, 25 and 26 makes it possible to eliminate any dependency (conventional in a synchronous algorithm) of the measurement on the phase shift between the excitation and the reference cosine wave/sine wave.

The first main processing phase then comprises the step of producing the amplitude amp(Va) of the first measurement voltage Va from the first doubly integrated signal SIIa1$n$ and the second doubly integrated signal SIIa2$n$.

For this purpose, the first doubly integrated signal SIIa1$n$ and the second doubly integrated signal SIIa2$n$ are added together by the adder 25. The calculation block 26 then calculates a square root of the output signal of the adder 25. Then the gain G of the gain block 27 is applied at the output of the calculation block 26.

The gain G of the gain block 27 is such that: G=1/(2^(ADC_Nbits−1)/10*(Nstep_demod)/2)/(Nstep_demod/2), where:

1/(2^(ADC_Nbits−1)/10 makes it possible to correct the nominal gain of the analog-to-digital conversion carried out by the analog-to-digital converter (for an N-bit analog-to-digital converter with a full-scale range of 10 V);

Nstep_demod makes it possible to correct the gain of the first integration over an excitation period (corresponding to NPT sampling intervals);

Nstep_demod/2 makes it possible to correct the gain of the second integration over half an excitation period (corresponding to NPT/2 sampling intervals);

½ is a constant. This constant comes from the underlying trigonometric formula of the synchronous demodulation algorithm sin a·sin b=½ (sin(a+b)/2+sin(a−b)/2 and equivalent formula).

The gain G is thus defined so as to correct a gain of the analog-to-digital converter, a gain of the first integrator block 12, a gain of the second integrator block 14 (which blocks carry out the first integration), a gain of the third integrator block 21 and a gain of the third integrator block 23 (which blocks carry out the second integration).

The amplitude amp(Va) of the first measurement voltage Va is obtained at the output of the gain block 27.

The amplitude amp(Va) of the first measurement voltage Va is equal to $G \cdot \sqrt{(SIIa1n^2 + SIIa2n^2)}$.

All of the steps that have just been described are also carried out in the same manner on the second measurement voltage Vb. A first resulting signal SRb1$n$ and a second resulting signal SRb2$n$, a first integrated signal SIb1$n$ and a second integrated signal SIb2$n$, and a first doubly integrated signal SIIb1$n$ and a second doubly integrated signal SIIb2$n$ are thus obtained.

The amplitude amp(Vb) of the second measurement voltage Vb is then obtained.

The amplitude amp(Vb) of the second measurement voltage Vb is equal to $G \cdot \sqrt{(SIIb1n^2 + SIIb2n^2)}$.

The measurement method then includes a first final processing phase, which comprises the step of producing an estimate of a position of the magnetic core 2 from the amplitudes of the two measurement voltages.

The estimate of the position of the magnetic core 2 is obtained from the ratio R:

$$R=(amp(Va)-amp(Vb))/(amp(Va)+amp(Vb)).$$

Figure 4:
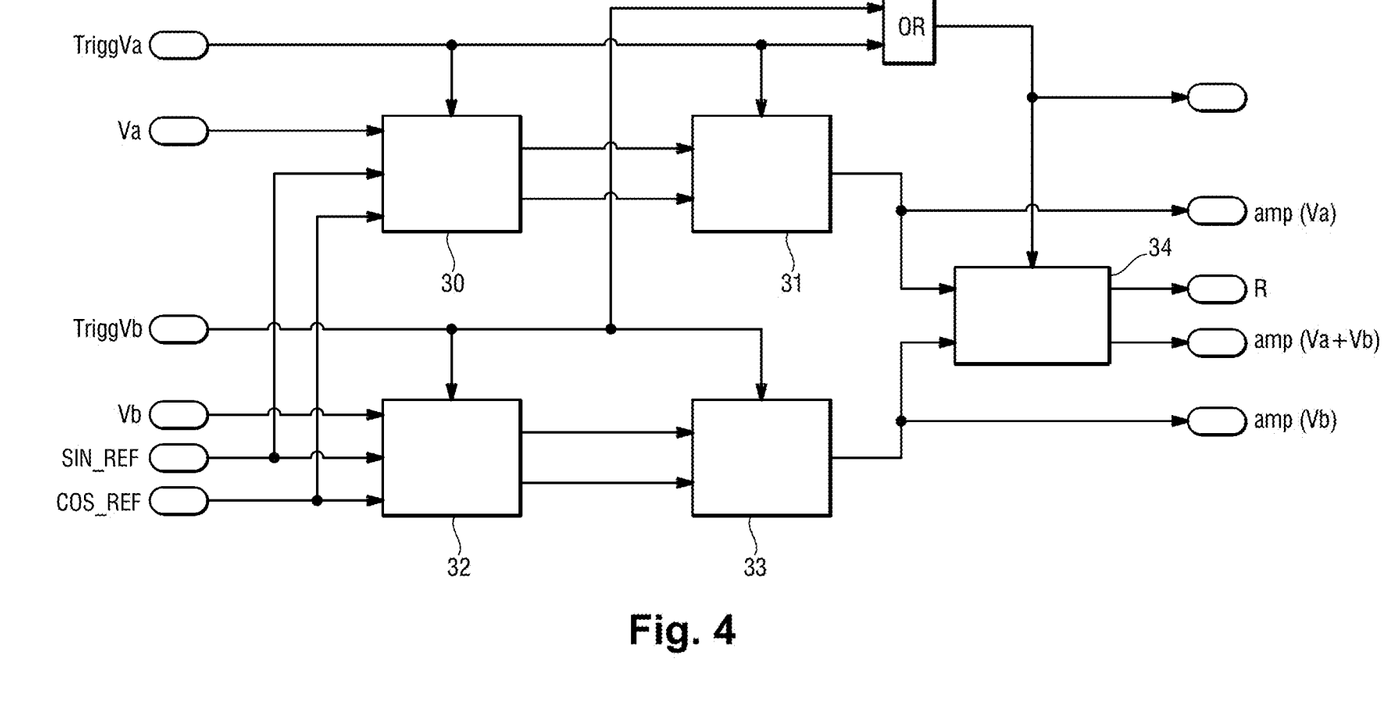
FIG. 4 depicts the measurement method according to the invention.

The first main processing phases and the first final processing phase, which have just been described, are depicted at a higher level (system level) in FIG. 4.

The blocks 30 and 31 represent the first main processing phase performed on the first measurement voltage Va.

The block 30 thus acquires the first measurement voltage Va and also the reference sine wave SIN_REF and the reference cosine wave COS_REF and produces the first doubly integrated signal SIIa1$n$ and the second doubly integrated signal SIIa2$n$.

The block 31 acquires the first doubly integrated signal SIIa1$n$ and the second doubly integrated signal SIIa2$n$ and produces the amplitude amp(Va) of the first measurement voltage Va.

The first processing phase is triggered by the signal TriggVa at each new acquisition of a sampled value Van of the first measurement voltage Va.

Likewise, the blocks 32 and 33 represent the first main processing phase performed on the second measurement voltage Vb.

The block 32 thus acquires the second measurement voltage Vb and also the reference sine wave SIN_REF and the reference cosine wave COS_REF and produces the first doubly integrated signal SIIb1$n$ and the second doubly integrated signal SIIb2$n$.

The block 33 acquires the first doubly integrated signal SIIb1$n$ and the second doubly integrated signal SIIb2$n$ and produces the amplitude amp(Vb) of the second measurement voltage Vb.

The first processing phase is triggered by the signal TriggVb at each new acquisition of a sampled value Vbn of the first measurement voltage Vb.

Finally, the block 34 represents the first final processing phase. The block 34 acquires the amplitude amp(Va) of the first measurement voltage Va and the amplitude amp(Vb) of the second measurement voltage Vb. The block 34 produces the ratio R and therefore an estimate of the position of the magnetic core 2. The block 34 also produces the amplitude amp(Va+Vb) of the sum of the first measurement voltage Va and of the second measurement voltage Vb.

If necessary, the ratio R can be calculated at each sampling period of the first measurement voltage Va and/or of the second measurement voltage Vb (especially if the samples are alternate).

The measurement method also allows a rate of change of the position of the magnetic core 2 of the LVDT sensor 1 to be estimated.

For this purpose, the measurement method carries out sliding synchronous demodulation on a velocity signal VR(t) representing the rate of change of the ratio R. The sliding synchronous demodulation is carried out during a second main processing phase, which is similar to the first main processing phase and is carried out concurrently with the first phase.

The following applies:

$$VR(t)=dR/dt=d(Va(t)-Vb(t))/((Va(t)+Vb(t))\cdot dt),$$

with Va(t)+Vb(t)=V0.

Here, V0 is assumed to be constant over an excitation period Texc, which in consistent with a standard assumption for an LVDT sensor, regardless of the position or of the rate of change of the position.

Thus, dVa(t)=−dVb(t).

The following then also holds true:

$$dVa(t)/dt=VR(t)\cdot V0/2=VR(t)\cdot(\text{amp}(Va)+\text{amp}(Vb)/2.$$

If the velocity VR(t) is assumed to be constant over an excitation period Texc, the following applies:

$$VR(t)=dR\cdot \text{Fexc}=(dVa-dVb)\cdot \text{Fexc}/V0,$$

where dVa is the change in amplitude of the first measurement voltage Va over an excitation period Texc, and where dVb is the change in amplitude of the second measurement voltage Vb over an excitation period Texc.

The velocity VR may be positive or negative, unlike the ratio R, which is necessarily positive and is between 0 and 1.

Since the synchronous demodulation produced by the first main processing phase described above provides the amplitude of the input signal, and therefore an absolute value, the signals cannot be directly introduced into the algorithms corresponding to the first main processing phase. In that case, the algorithm would produce the absolute value of the velocity. However, the velocity may be negative.

The measurement method therefore includes a preliminary phase, which comprises the step of producing two "crossed" voltages, each of which is dependent on the two measurement voltages.

For the first measurement voltage Va, a first crossed voltage VCa is produced, which is such that:

$$VCa(n)=(Va(n)+Vb(n))\cdot V\text{max}+(Va(n)-Va(n-1/\text{Fexc}))*\text{Fexc}.$$

For the second measurement voltage Vb, a second crossed voltage VCb is produced, which is such that:

$$VCb(n)=(Va(n)+Vb(n))\cdot V\text{max}+(Vb(n)-Vb(n-1/\text{Fexc}))*\text{Fexc}.$$

In these formulae, VCa(n), VCb(n), Va(n) and Vb(n) are the $n^{th}$ samples of the first crossed voltage, of the second crossed voltage, of the first measurement voltage Va and of the second measurement voltage Vb, respectively, Vmax is a maximum expected absolute value of the rate of change of the position of the magnetic core, and Fexc is the excitation frequency of the excitation voltage; (n−1/Fexc) represents the index of the sample acquired one excitation period before the sample n, the time between the two samples n and (n−1/Fexc) being the interval of the derivative dt=1/Fexc.

In this second main processing phase (which is similar to the first main processing phase), the sliding synchronous demodulation is then performed on the first crossed voltage VCa(n) and on the second crossed voltage VCb(n). This processing is performed concurrently with the first main processing phase (position measurement).

Figure 5:
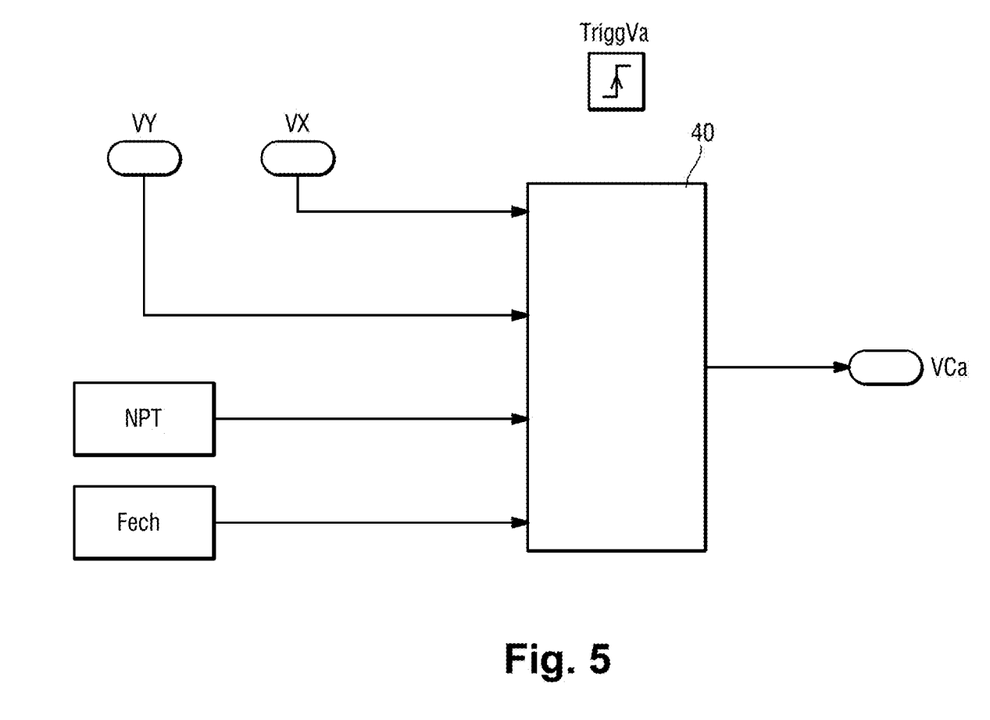
FIG. 5 depicts a preliminary phase.

FIG. 5 illustrates the preliminary phase for the measurement voltage VCa. The block 40 acquires the voltage VX, with VX=Va, and the voltage VY, with VY=Vb, the sampling frequency Fech and the value NPT.

The block 40 then produces the first crossed voltage VCa(n).

A block 41 similar to the block 40 is used in order to produce the second crossed voltage VCb(n), with VX=Vb and VY=Va.

An exemplary algorithm of the preliminary phase is provided in Appendix 2 to this description.

Figure 6:
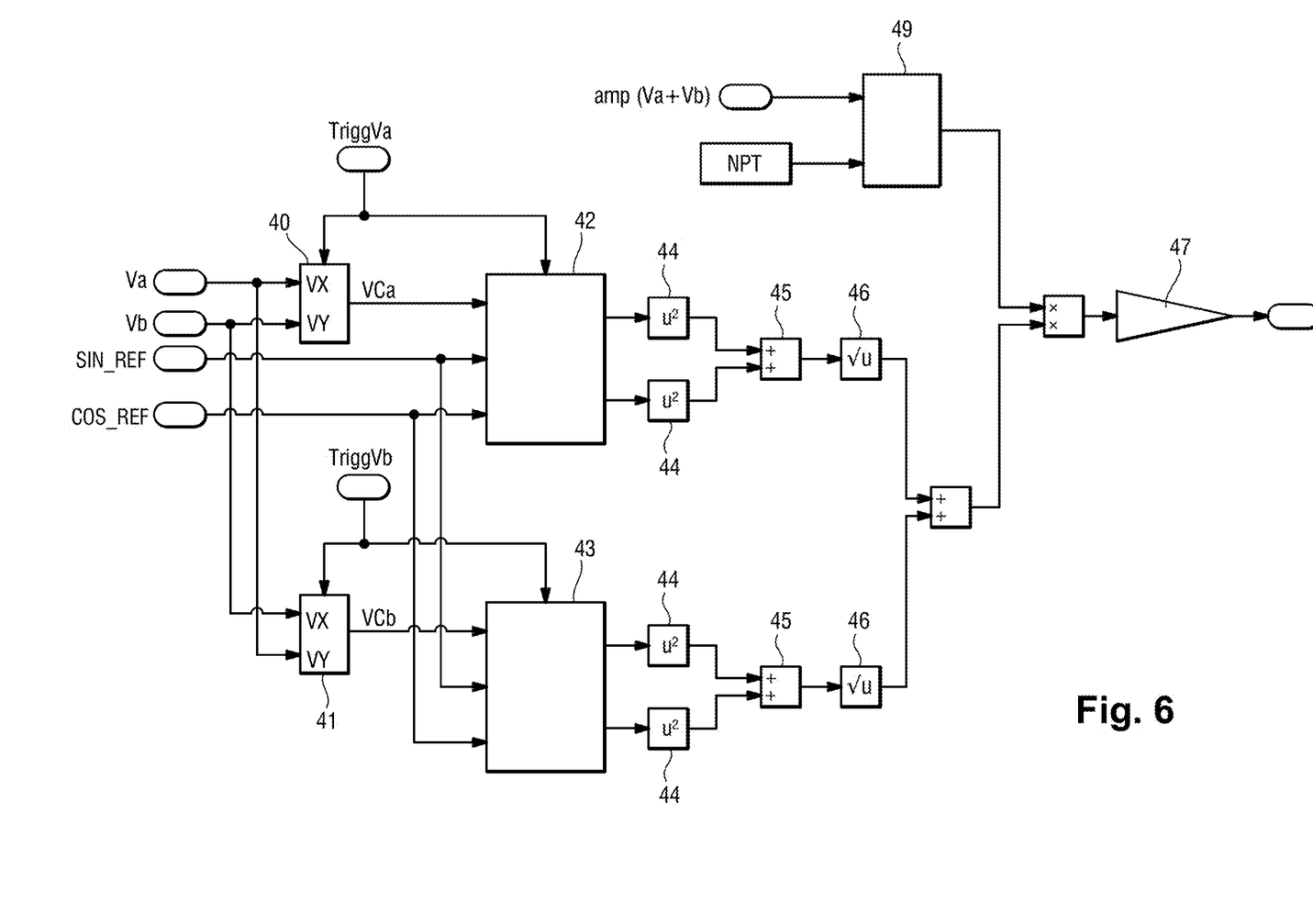
FIG. 6 depicts a second main processing phase and a second final processing phase.

FIG. 6 illustrates the velocity measurement in its entirety. The block 40 and the block 41 carry out the preliminary phase and produce the first crossed voltage VCa(n) and the second crossed voltage VCb(n), respectively.

Then the second main processing phase, which is similar to the first main processing phase, is performed on the first crossed voltage VCa(n) and on the second crossed voltage VCb(n).

The block 42 represents the performance of the first integration and of the second integration on the first crossed voltage VCa(n), while the block 43 represents the performance of the first integration and of the second integration on the second crossed voltage VCb(n). The blocks 44, 45, and 46 correspond to the exponentiator blocks, the adder and the calculation block, respectively, described above.

It should be noted that the second integration is not necessarily carried out.

The sliding synchronous demodulation of VCa(n) performed during the second main processing phase gives an amplitude value equal to:

$$V\text{out}a=(V0\cdot V\text{max}+dVa\cdot \text{Fexc}).$$

The synchronous demodulation of VCb(n) performed during the second main processing phase gives an amplitude value equal to:

$$V\text{out}b=(V0\cdot V\text{max}+dVb\cdot \text{Fexc}).$$

A ratio R', which is similar to the ratio R, is calculated as follows:

$$R'=(V\text{out}a-V\text{out}b)/(\text{amp}(Va)+\text{amp}(Vb)),$$

i.e. R'=(Vouta−Voutb)/(amp(Va+Vb)),
i.e. R'=2·dVa·Fexc/V0,
therefore R'=dR/dt rate of change of position
since dVa(t)/dt=VR(t)·V0/2=−dVb/dt and dt=1/Fexc
where:
Vouta and Voutb are the outputs of the second main processing phase, said main processing being applied to the signals generated for the velocity measurement, and where amp(Va) and amp(Vb) are the amplitude of the first measurement voltage and the amplitude of the second measurement voltage, respectively, said amplitudes being provided by the first main processing phase (or amp(VA+Vb) is the amplitude of the sum Va+Vb).

The signal amp(Va+Vb) derived from the position demodulation algorithm is used via a fifth integrator block 49. Depending on the precision gains, simple filtering can optionally be added.

The gain block 47 applies a final gain G:

$$G = \text{single}(1/(2^{(ADC\_Nbits-1)}/10*\text{single}(Nstep\_demod)/2)).$$

The final gain compensates for the analog-to-digital converter gain and the integration gain (only the first integration is taken into account in this formula), and also the trigonometric gain equal to ½.

Of course, the invention is not limited to the described embodiment but encompasses all variants that fall within the scope of the invention as defined by the claims.

Although it has been stated herein that the inductive displacement sensor is an LDVT, the invention can also be applied to a different inductive displacement sensor, for example an RVDT. The invention applies more generally to any sensor which bases its acquisition on synchronous demodulation.

The computer described herein includes a single analog-to-digital converter. However, two analog-to-digital converters connected in parallel can be used, and the first measurement voltage and the second measurement voltage can be acquired simultaneously. The sampling frequency can then be divided by 2. The choice between simultaneous acquisition and alternate acquisition depends on the hardware and its optimization (the number of analog-to-digital converters and the maximum achievable sampling frequency).

APPENDICES

APPENDIX 1

```
function y = fcn_ordre0(A,Nstep_demod)

persistent mat % FPGA storage of the data acquired (memory
traversed cyclically)
persistent cnt % position of the last datum acquired in the
memory mat if isempty(mat) % initialization
   mat=single(zeros(500));
   cnt=uint8(1); % Counter to count number of times enabled
end if (cnt==Nstep_demod+1) % return to the start of the memory
once the end of the area has been reached
cnt=uint8(1);
end if cnt <= Nstep_demod
   mat(cnt)=A; % storage of the last datum acquired
   cnt=cnt+1;  % incrementation of the memory position
            % counter
end add=single(0); % integration over one
            % demodulation period
for i=1:Nstep_demod
    add=add+mat(i);
``` end y=add;

APPENDIX 2

```
function y = memoire_periode(X,Y,Nstep_demod,Fsample)

persistent matX % FPGA storage of the data acquired (memory traversed cyclically)
persistent matY % FPGA storage of the data acquired (memory traversed cyclically)
persistent cnt % position of the last datum acquired in the memory mat if isempty(matX) % initialization
  matX=single(zeros(500));
  matY=single(zeros(500));
  cnt=uint8(1); % Counter to count number of times enabled
end if (cnt==Nstep_demod+1) % return to the start of the memory
                        %once the end of the area has been
                reached
cnt=uint8(1);
end oldX=matX(cnt); % storage of the value of VX from one
% demodulation period earlier
oldY=matY(cnt); % storage of the value of VY from one
% demodulation period earlier
matX(cnt)=X;        %storage of the last value of VX
matY(cnt)=Y;        %storage of the last value of VY
```

```
add=single(0);
add=(matX(cnt)+matY(cnt))*100/Fsample*single(Nstep_demod)/2
; % with 100/s = % Vmax=100/s for the example
% Fsample*Nstep_demod = 1/Tref
add=add+(matX(cnt)-oldX);
%Fsample/single(Nstep_demod)/2 = Fref = freq su ref sine wave cnt=cnt+1;

y=add;
``` end
y=add;

The invention claimed is:

1. A measurement method using an inductive displacement sensor that includes a transformer and a magnetic core, the transformer comprising a primary winding and two secondary windings, the measurement method including:
  an excitation phase comprising the step of applying an AC excitation voltage across the terminals of the primary winding;
  an acquisition phase comprising the steps that have the aim of acquiring and digitizing two measurement voltages (Va, Vb) across the terminals of the two secondary windings;
  a first main processing phase, which is performed on the two measurement voltages and which, for each measurement voltage, comprises the steps of:
  multiplying the measurement voltage by a reference sine wave and by a reference cosine wave in order to obtain two resulting signals (SRa1$n$, SRa2$n$);
  carrying out a first integration of each resulting signal over a sliding window that has a width equal to the excitation period in order to obtain two integrated signals (SIa1$n$, SIa2$n$);
  carrying out a second integration of each integrated signal over a sliding window that has a width equal to half an excitation period in order to obtain two doubly integrated signals (SIIa1$n$, SIIa2$n$);
  producing an amplitude of the measurement voltage from the doubly integrated signals;
  a first final processing phase, which comprises the step of producing an estimate of a position of the magnetic core from the amplitudes of the two measurement voltages.

2. The measurement method as claimed in claim 1, wherein, for each measurement voltage Vx, the amplitude of the measurement voltage is equal to $G \cdot \sqrt{(SIIx1n^2 + SIIx2n^2)}$, where G is a gain and where SIIx1$n$ and SIIx2$n$ are the doubly integrated signals of the measurement voltage Vx.

3. The measurement method as claimed in claim 2, wherein the gain G is defined so as to correct a gain of an analog-to-digital conversion, a gain of the first integration, a gain of the second integration and a trigonometric gain equal to ½.

4. The measurement method as claimed in claim 1, furthermore including a preliminary phase, which comprises the step of producing two crossed voltages (VCa, VCb), each of which is dependent on the two measurement voltages, a second main processing phase, which is similar to the first main processing phase but is performed on the two crossed voltages, and a second final processing phase, which comprises the step of producing an estimate of a rate of change of the position of the magnetic core.

5. The measurement method as claimed in claim 4, wherein the two crossed voltages are such that $$VCa(n)=(Va(n)+Vb(n))\cdot V\max+(Va(n)-Va(n-1/Fexc))*Fexc$$

$$VCb(n)=(Va(n)+Vb(n))\cdot V\max+(Vb(n)-Vb(n-1/Fexc))*Fexc,$$

where VCa(n), VCb(n), Va(n) and Vb(n) are the $n^{th}$ samples of a first crossed voltage, of a second crossed voltage, of a first measurement voltage and of a second measurement voltage, respectively, where Vmax is a maximum expected absolute value of the rate of change of the position of the magnetic core, and where Fexc is an excitation frequency of the excitation voltage, and where (n−1/Fexc) represents the index of a sample acquired 1 excitation period before the sample n.

6. A computer intended to be connected to an inductive displacement sensor, the computer comprising a processing component and an analog-to-digital converter, which are designed to perform the measurement method as claimed in claim 1.

7. A system comprising a computer as claimed in claim 6 and an inductive displacement sensor.

* * * * *